United States Patent
Slowiak et al.

(10) Patent No.: US 11,328,356 B1
(45) Date of Patent: May 10, 2022

(54) DIGITAL IDENTITY LOCK

(71) Applicant: Early Warning Services, LLC, Scottsdale, AZ (US)

(72) Inventors: Gregory Slowiak, Chicago, IL (US); Eric Woodward, San Francisco, CA (US); Philip Lam, San Francisco, CA (US); Jeff Shultz, Waco, TX (US)

(73) Assignee: Early Warning Services, LLC, Scottsdale, AZ (US)

( * ) Notice: Subject to any disclaimer, the term of this patent is extended or adjusted under 35 U.S.C. 154(b) by 143 days.

(21) Appl. No.: 16/908,460

(22) Filed: Jun. 22, 2020

Related U.S. Application Data (60) Provisional application No. 62/864,900, filed on Jun. 21, 2019, provisional application No. 62/864,911, filed on Jun. 21, 2019, provisional application No. 62/864,889, filed on Jun. 21, 2019, provisional application No. 62/864,891, filed on Jun. 21, 2019, provisional application No. 62/864,906, filed on Jun. 21, 2019.

(51) Int. Cl.
*G06Q 40/02* (2012.01)
*G06F 21/30* (2013.01)
*G06F 21/62* (2013.01)

(52) U.S. Cl.
CPC ......... *G06Q 40/025* (2013.01); *G06F 21/305* (2013.01); *G06F 21/6263* (2013.01)

(58) Field of Classification Search
CPC .................................................. G06Q 40/025
See application file for complete search history.

(56) References Cited

U.S. PATENT DOCUMENTS

| | | | |
|---|---|---|---|
| 10,069,811 B2 * | 9/2018 | Curtis | H04L 63/08 |
| 10,237,259 B2 | 3/2019 | Ronda et al. | |
| 10,853,791 B1 * | 12/2020 | Ellis | G06Q 20/405 |

(Continued)

FOREIGN PATENT DOCUMENTS

CA 3074350 A1 * 9/2020 ......... G06Q 20/3224

OTHER PUBLICATIONS

U.S. Appl. No. 16/908,435, Non-Final Office Action, dated Nov. 2, 2021, 14 pages.

(Continued)

*Primary Examiner* — Scott C Anderson
(74) *Attorney, Agent, or Firm* — Kilpatrick Townsend & Stockton LLP (57) ABSTRACT

Described herein is an identity network for authenticating a user for a relying party and providing access to the user's credit report. The identity network may receive an unlock request for the digital identity and credit report of a user from a relying party. In response, the identity network may provide an identity provider link for accessing the identity provider application. The user may login to the identity provider application and provide consent for obtaining the user's credit report. The identity provider provides the identity network with verification of the digital identity of the user and the consent response from the user. The identity network can request access from a credit reporting agency and receive a credit report key in response. The identity network can provide the credit report key to the relying party, which can use the key to access the user's credit report from the credit reporting agency.

20 Claims, 6 Drawing Sheets

(56) References Cited

U.S. PATENT DOCUMENTS

| | | | |
|---|---|---|---|
| 11,157,954 B1 | 10/2021 | Belanger et al. | |
| 2010/0145861 A1 | 6/2010 | Law et al. | |
| 2010/0154046 A1 | 6/2010 | Liu et al. | |
| 2013/0036456 A1 | 2/2013 | Boysen et al. | |
| 2014/0173754 A1 | 6/2014 | Barbir | |
| 2015/0332029 A1 | 11/2015 | Coxe et al. | |
| 2017/0186084 A1* | 6/2017 | Koch | G06Q 40/02 |
| 2018/0152440 A1 | 5/2018 | Hande et al. | |
| 2018/0267847 A1 | 9/2018 | Smith et al. | |
| 2019/0261169 A1 | 8/2019 | Kamal et al. | |
| 2020/0213297 A1 | 7/2020 | Suraparaju | |
| 2020/0366671 A1 | 11/2020 | Larson et al. | |
| 2021/0014218 A1 | 1/2021 | Kurylko et al. | |
| 2021/0320799 A1 | 10/2021 | Bankston | |
| 2021/0326426 A1 | 10/2021 | Bouse | |

OTHER PUBLICATIONS

U.S. Appl. No. 16/908,443, Non-Final Office Action, dated Nov. 9, 2021, 14 pages.

* cited by examiner

DIGITAL IDENTITY LOCK

CROSS REFERENCES

This application claims the benefit of and priority to, pursuant to 35 USC § 119, U.S. Provisional Application No. 62/864,891, filed Jun. 21, 2019, entitled "DIGITAL IDENTITY," U.S. Provisional Application No. 62/864,900, filed Jun. 21, 2019, entitled "DIGITAL IDENTITY SIGN-UP," U.S. Provisional Application No. 62/864,906, entitled "DIGITAL IDENTITY SIGN-IN," U.S. Provisional Application No. 62/864,911, entitled "DIGITAL IDENTITY STEP-UP," and U.S. Provisional Application No. 62/864,889, entitled "DIGITAL IDENTITY LOCK," each of which is assigned to the assignee hereof, and each of which are incorporated herein in their entirety by reference for all purposes.

U.S. patent application Ser. No. 16/908,435, filed concurrently herewith, entitled "DIGITAL IDENTITY," U.S. patent application Ser. No. 16/908,443, filed concurrently herewith, entitled "DIGITAL IDENTITY SIGN-UP," U.S. patent application Ser. No. 16/908,453, filed concurrently herewith, entitled "DIGITAL IDENTITY SIGN-IN," and U.S. patent application Ser. No. 16/908,456, filed concurrently herewith, entitled "DIGITAL IDENTITY STEP-UP," are each incorporated by reference in their entirety for all purposes.

BACKGROUND

Most companies have an online presence today and each has information about each of its users and customers. However, authentication of a user is largely handled piecemeal by each company with little verification of the user by a trusted source. The current way that users are Onboarded and authenticated lacks security, consistency, and ease of use for both the companies and the users. Further, accessing credit history for users is cumbersome for all parties, and unauthorized users are able to obtain credit fraudulently under the existing systems.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for controlling access to an authenticated, universal digital identity for a user using an identity network. The identity network may receive an unlock request for a digital identity for a user from a relying party. The identity network may provide a session identifier and an identity provider link to the relying party. The identity provider may launch, using a software development kit integrated into the relying party application and the identity provider link, an identity provider application of an identity provider associated with the identity provider link, where launching the identity provider application includes providing the session identifier. The identity network may receive, from the identity provider, validation of the digital identity for the user and a consent response from the user for unlocking a credit report of the user for the relying party. The identity network may transmit the consent response and the session identifier to a credit reporting agency. The identity network may receive, from the credit reporting agency, a credit report key for the credit report of the user for use by the relying party and the session identifier. The identity network may transmit the credit report key and the session identifier to the relying party. Other embodiments of this aspect include corresponding computer systems, apparatus, and computer programs recorded on one or more computer storage devices, each configured to perform the actions of the methods.

Implementations may include one or more of the following features. Optionally, the identity network may receive a device identifier of a device being used by the user and may use the device identifier to identify the identity provider. Optionally, receiving validation of the digital identity for the user includes receiving an indication that the digital identity of the user was authenticated by the identity provider. Optionally, the identity network may receive the device identifier and perform a device check based on the device identifier. To perform the device check, the identity network may obtain activity associated with the device identifier, calculate a confidence score based on the activity associated with the device identifier and the unlock request, and transmit the confidence score to the relying party with the credit report key. Optionally, the identity network may receive a detail request from the identity provider and transmit at least a portion of the unlock request to the identity provider in response. Optionally, the relying party uses the credit report key to obtain the credit report of the user from the credit reporting agency. Implementations of the described techniques may include hardware, a method or process, or computer software on a computer-accessible medium.

DETAILED DESCRIPTION

The explosion of online user activity and data over the past decades have resulted in a disparate system in which most online companies have developed their own systems for users to sign-up, sign in, and utilize their services. Authentication of users is often difficult to ensure that online identity theft and other sinister activities are avoided. Further, the process for creation of new accounts and tracking of countless passwords for users is tedious. Additionally, accessing credit information for users is cumbersome for all parties and is fraught with issues including the ease of access for unauthorized users to open lines of credit fraudulently using another's identification.

To solve the problem of invalid authentication and password security for users, described herein is a system for an authenticated, universal digital identity that a user may use to validate the user and provide credit access to relying parties of the system. Users often have a trusted relationship with their banks, and banks are regulated so certain precautions are taken by banks to ensure the user is a legitimate and authenticated user. Banks and other providers that have regulated processes for identifying users may be used to authenticate users with a digital identity authentication and provide information on the users for relying companies by becoming an identity provider in the disclosed identity network. Relying companies, such as insurance companies, retailers, and so forth can enroll with the identity network to gain the benefit of the identity provider authenticating the digital identity of users and customers and providing verified information upon account sign-up for a new customer. The identity network can broker authentication and information exchange using cryptographic technology and other verifiable methods between the relying party and the identity provider. Additional technological value can be provided by the identity network, which can oversee and identify suspicious activity overall for a device or user given their online activities associated with any identity provider, obtain information from various third parties for the relying party to further validate the user, and so forth. Additionally, the identity network can broker access to the user's authenticated digital identity credit report with a credit reporting agency between the credit reporting agency and a relying party with whom the user is trying to obtain a line of credit.

Figure 1:
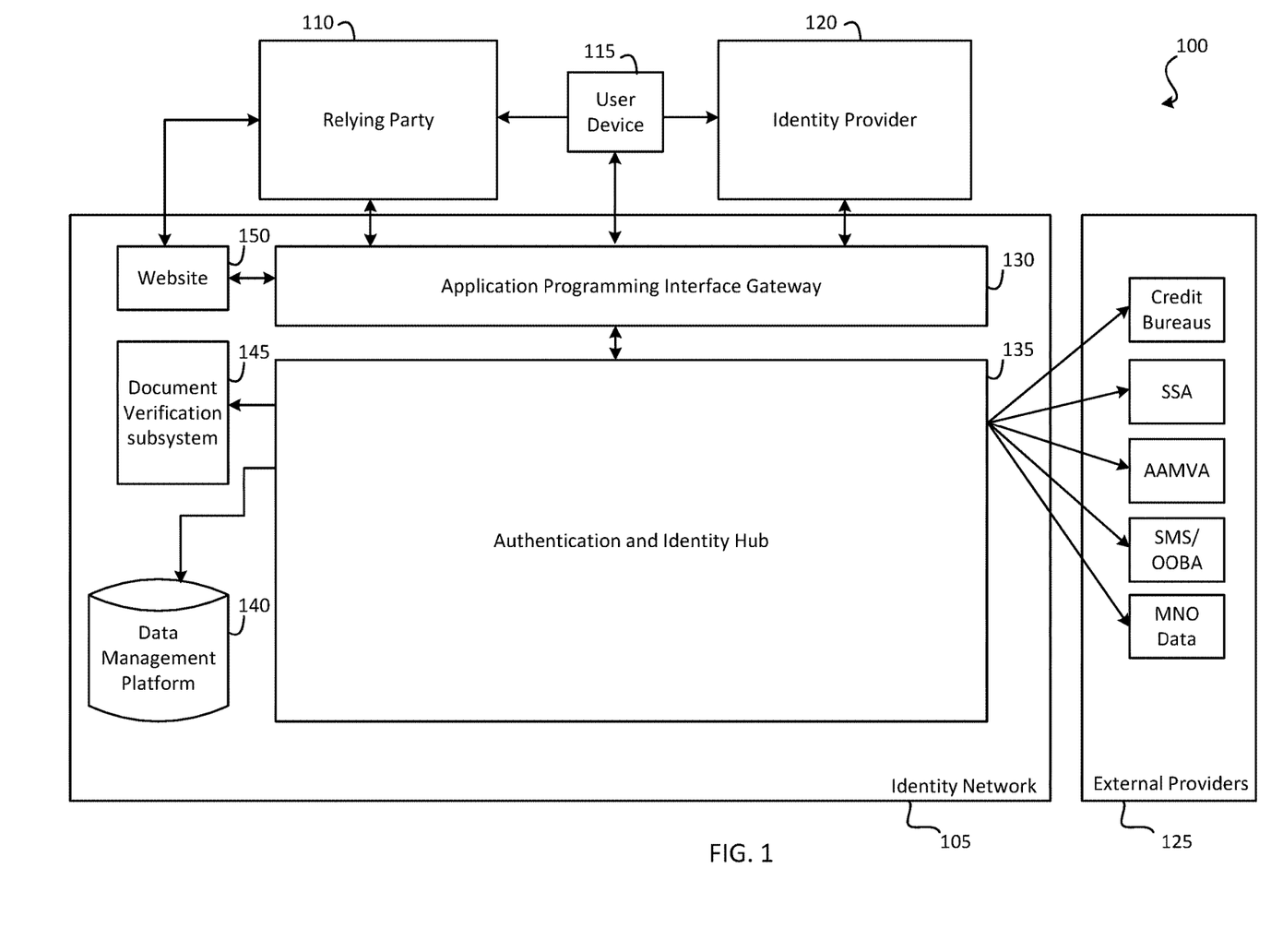
FIG. 1 illustrates an example system for providing an authenticated, universal digital identity for a user, according to an embodiment.

FIG. 1 illustrates an example digital identity system 100 for authenticated, universal digital identities for users. System 100 includes an identity network 105, relying party 110, user device 115, identity provider 120, and external providers 125. Components or functionality described may be combined into fewer components or expanded into more components without departing from the scope of the invention.

Identity network 105 may include a network of one or more computers, such as computing device 600. The identity network 105 may include application programming interface gateway 130, authentication and identity hub 135, data management platform 140, document verification subsystem 145, and website 150. Identity network 105 may include other components or functionality than discussed or functionality may be combined into fewer or more components without departing from the scope of the invention. Identity network 105 provides the functionality to broker authentication and information exchange between the relying party 110 and the identity provider 120 as discussed in more detail herein.

Application programming interface gateway 130 provides a gateway for the relying party 110, user device 115, identity provider 120, and the website to interact with the authentication and identity hub 135. The authentication and identity hub 135 interfaces between various components and collects information needed for identity assertions. For example, authentication and identity hub 135 may collect information from external providers 125 including, for example, credit bureaus, the social security administration, the American association of motor vehicle administrators, and other external providers that utilize out-of-band authentication (e.g., secure message service out-of-band authentication), and/or mobile network operator data. Various data from external providers may be used depending on the request from the relying party 110, which will be described in greater detail with respect to FIG. 2.

Authentication and identity hub 135 also interfaces with the document verification subsystem 145 for verifying documents. The document verification subsystem 145 may be a third party subsystem or may interface with a third party subsystem in some embodiments. The authentication and identity hub 135 may interface with the document verification subsystem 145 using an application programming interface. The document verification subsystem enables the identity network 105 to request a standard identity document from an end user on user device 115. The standard identity document may be, for example, a driver license, state-issued identification, or country-issued passport. The document verification subsystem 145 can validate the document presented by the user is a legitimate document, that the identity attributes match those of the identity provider 120 for the given user, and that the document photo matches the end user holding the document. The document verification subsystem 145 can also verify data submitted by an end user against data found on authoritative documents such as a state issued driver license or a United States Passport, for example. In some embodiments, when a user submits data or information using user device 115, the authentication and identity hub 135 may provide the data to the document verification subsystem 145 in conjunction with information from an external provider 125. The document verification subsystem 145 can extract information from the documents provided from the external providers 125 and compare it to the data the user provided. For example, the user may provide a driver license number, and the document verification subsystem 145 may extract the user's driver license number from the user's driver license obtained from an external provider 125 (e.g., the state department of motor vehicles) and compare the two values to ensure the user entered data is accurate.

Authentication and identity hub 135 also interfaces with data management platform 140. Data management platform 140 can provide, for example, identity confidence scores and/or device reputation information. For example, the identity network 105 may identify based on a common device id (described in more detail with respect to FIG. 4) activity of a device at one or more identity providers 120 and/or one or more relying parties 110. This activity can be modelled and compared to models that may indicate whether the activity the device is engaging in is suspicious. If suspicious activity is detected, new requests may be flagged for the relying party 110 requesting the information or authentication. Similar to device reputation, identity reputation models capture network behavior of a given user to determine inconsistencies that correlate to potential fraud. The identity reputation and/or the device reputation information may be used to generate an identity confidence score used to help a relying party determine if the confidence is sufficient to proceed with the relying party use of the digital identity or if the relying party may instead, for example, require additional authentication information from the user. The authentication and identity hub 135 can interface with the data management platform 140 using an application programming interface.

Website 150 may be an internet interface provided by identity network 105 that a relying party 110 may redirect the end user, for example, to select their identity provider 120 when a request is initiated. Website 150 may redirect the user to their identity provider 120 website or mobile application via a matrix barcode (e.g., a QR code), a deep link, a website link, or via a short message service (SMS) or mobile push notification. In some embodiments, the relying party 110 may include a software development kit from the identity network 105 that is used to redirect the user to the website 150 to select the user's identity provider 120 when a request is initiated.

Authentication and identity hub 135 may communicate digital identity data that is obtained from the identity provider 120 to the relying party 110 when the identity network 105 fulfills an identity assertion. An identity assertion may be an authentication request in which the relying party 110 requests that the identity provider 120 validate or authenticate the digital identity of the user. The authentication request is sent to the identity network 105 from the relying party 110 and forwarded to the identity provider 120 by the identity network 105.

Data management platform 140 is used to provide ledger functionality (e.g., distributed or non-distributed ledger or hyper ledger functionality) to identity network 105. The ledger may store a registered identifier for each user registered to a particular identity provider 120. It may also be used to create a record of instance of the sharing of identity attributes from identity provider 120 to a relying party 110 on behalf of an end user. Each request and response for authentication and digital identity data may be passed through the authentication and identity hub 135 to store every transaction in the ledger.

Digital identity data may be provided from the identity provider 120 to the authentication and identity hub 135. The hub may provide the digital identity information to the relying party 110.

Relying party 110 may be any company that would like to be able to authenticate the digital identity of a user. Examples of relying parties 110 include insurance companies, retailers, travel companies (e.g., airlines, hotels, and cruise lines), and the like. While only a single relying party 110 is depicted in FIG. 1 for the sake of simplicity of explanation, any number of relying parties 110 may be included in system 100.

Figure 6:
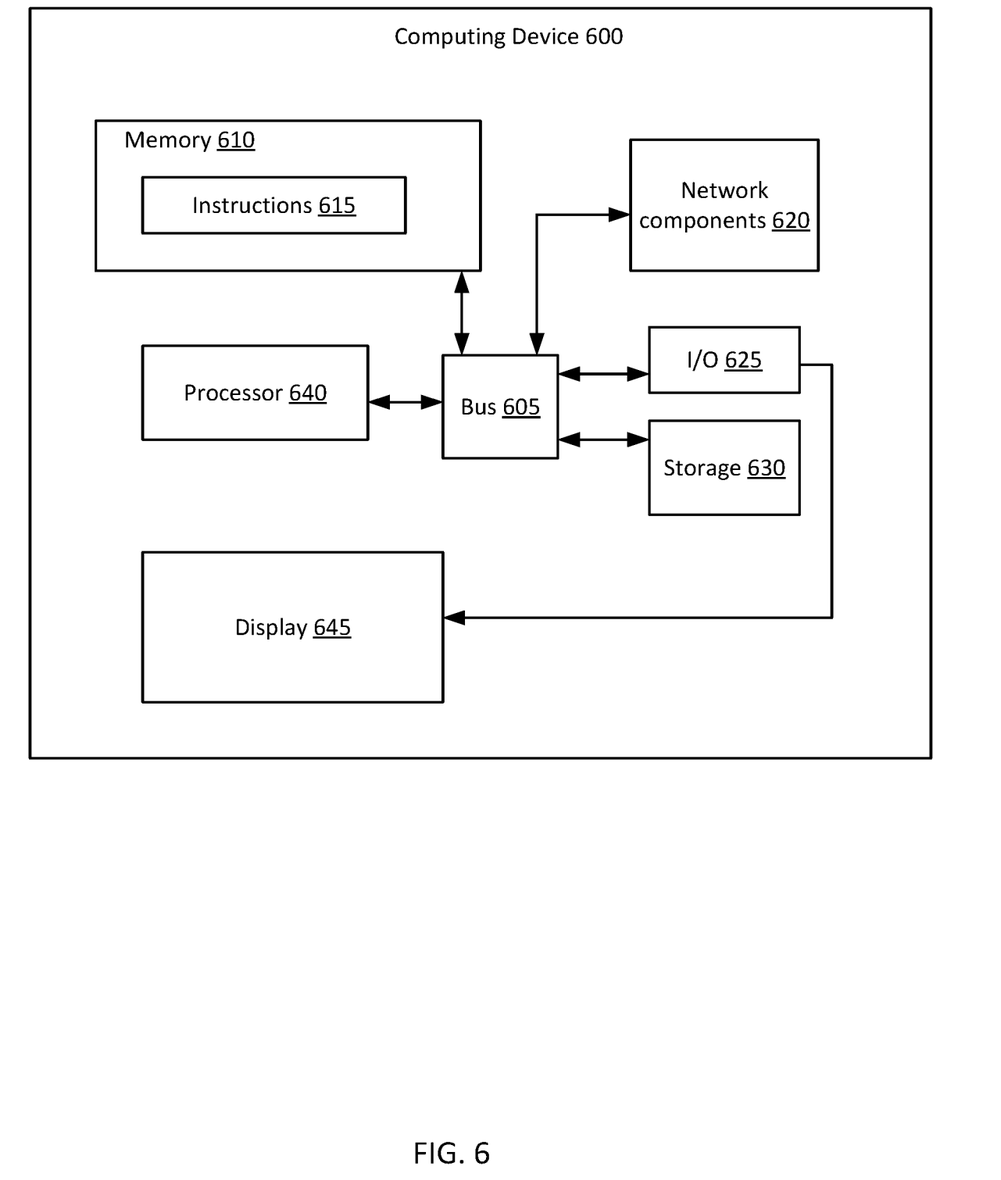
FIG. 6 illustrates an example computer system.

User device 115 may be any suitable computing device, such as computing device 600 as depicted and described with respect to FIG. 6, of a user. For example, user device 115 may be a laptop, smartphone, desktop computer, tablet, smartwatch, and the like. While only a single user device 115 is depicted in FIG. 1 for the sake of simplicity of explanation, any number of user devices 115 may be included in system 100.

Identity provider 120 may be any suitable company that can authenticate a user having user device 115 for relying party 110. Identity provider 120 may include, for example, financial institutions. Identity provider 120 may have detailed information and have verified the identity of the user of user device 115 because, for example, financial institutions are regulated by the government with respect to identifying customers with specificity. While only a single identity provider 120 is depicted in FIG. 1 for the sake of simplicity of explanation, any number of identity providers 120 may be included in system 100.

In use, a user may access a relying party 110 website using the user device 115. For example, the user may wish to initiate a new relationship with the relying party 110 to, for example, become a customer of the relying party 110. The relying party 110 may request digital identity authentication and information for the user of user device 115 from the identity network 105 via website 150. In some embodiments, user device 115 may access a mobile application of relying party 110. The mobile application may access website 150 with an identity assertion. The identity assertion may be a request to authenticate the digital identity of the user and, in some cases, request additional information about the user. In response, the website 150 may provide a list of identity providers 120 for the user to select for authenticating the user's digital identity. The list may include many identity providers 120, and the user should select an identity provider with which the user has a relationship. For example, if the user is a customer of BankA, and BankA is an identity provider in the list, the user may select BankA as the identity provider for authenticating that user's digital identity. If the user has a relationship with multiple identity providers 120, the user may select any one of the identity providers 120 with which the user has a relationship. Once the user selects an identity provider 120, the application programming interface gateway 130 may receive the identity assertion including requested data about the user and the selected identity provider 120 and provide the entire request to the authentication and identity hub 135. The authentication and identity hub 135 may then provide the identity assertion to the identity provider 120. The identity provider 120 can authenticate the digital identity of the user and provide the requested information via the application programming interface gateway 130 to the authentication and identity hub 135. The authentication and identity hub 135 may obtain other information requested by the relying party 110 but not included from the identity provider 120. The authentication and identity hub 135 may request and obtain the information from the external providers 125, for example. Once the information is complete, the authentication and identity hub 135 may provide the information in the identity provider node 145, which provides the information and acknowledgement of the authentication of the user's digital identity to the relying party 110. If the identity provider 120 cannot authenticate the digital identity of the user, the identity provider 120 can provide such failed authentication notice to the authentication and identity hub 135, and the authentication and identity hub 135 can inform the relying party 110 of the failed authentication.

Figure 2:
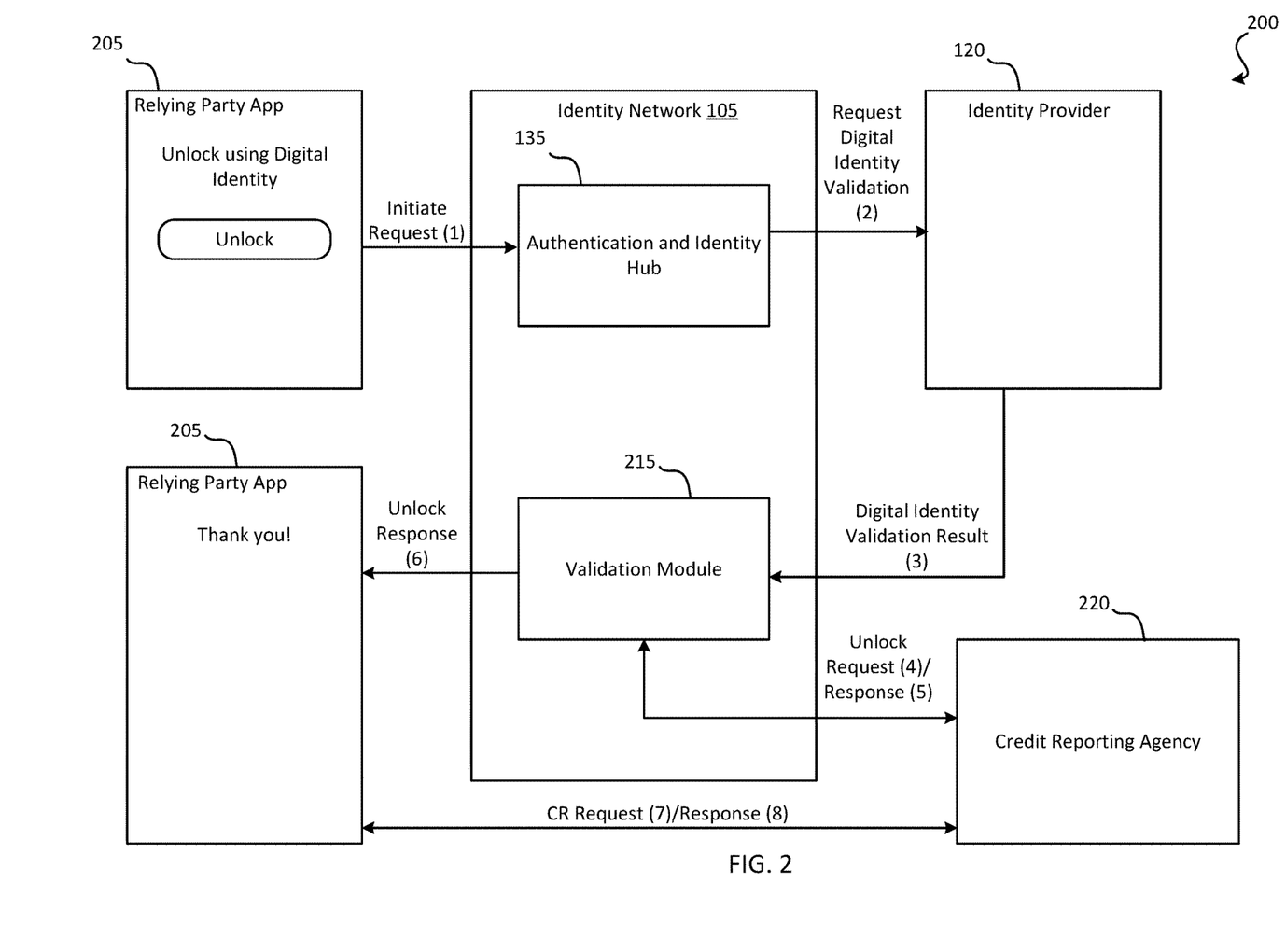
FIG. 2 illustrates an example data information flow using an authenticated, universal digital identity for a user, according to an embodiment.

FIG. 2 illustrates an example data information flow 200 using an authenticated, universal digital identity for a user. The flow begins with the relying party application 205. The user may access the relying party application on a mobile device or through a web browser to obtain, for example, a line of credit or some other service for which the relying party may wish to access the user's credit report before providing the service or line of credit. For example, insurance companies and cell phone service companies routinely check credit for new users or for adding new products to an existing customer's account. Accordingly, the relying party may be, for example, a retailer, an insurance company, or a cell phone service provider. Once the user has requested the product (e.g., line of service, line of credit, or so forth), the relying party application 205 may provide an option to unlock the user's credit report using the user's digital identity. When the user selects the digital identity unlock option, the relying party application sends a request to the identity network 105 to unlock the user's credit for the relying party (Initiate Request (1)).

The identity network 105 receives the request and uses authentication and identity hub 135 to identify the identity provider 120 that can authenticate the user. For example, the user may have registered with the identity network 105 and selected an identity provider 120, such as the user's bank, to authenticate the user. The user's digital identity may be associated with the user's mobile device used to access the relying party application 205 such that the request to unlock the user's credit may include a unique device identifier, which is discussed in more detail with respect to FIG. 4. In some embodiments, the user may have an identifier used on the identity network 105 specific to the user that may be used to identify the identity provider 120 for the user in the authentication and identity hub 135. As another example, when the user signs up and requests an identity provider 120 to authenticate the user, a token may be received (e.g., by the user, by the identity provider 120 upon request, generated by the authentication and identity hub 135, or so forth) and saved in the authentication and identity hub 135 for the user/identity provider relationship so that upon later requests to authenticate, the token can be identified in the authentication and identity hub 135 and the same identity provider 120 used. The identity network 105 may generate a session identifier for the request and transmit the session identifier to the relying party application 205 (not shown).

The identity network 105 requests authentication of the user's digital identity from the identity network 120 (Request Digital Identity Validation (2)). In some embodiments, the identity network 105 provides back to the relying party application 205 the identity provider link for the identity provider 120. A software development kit (SDK) for the identity network 105 may be incorporated into the relying party application 205 once the relying party registers with the identity network 105. When the relying party application 205 receives the identity provider link, the SDK can launch the identity provider application using the identity provider link. Whether through the SDK or directly, when the identity provider application is launched, the request to launch may include the session identifier from the identity provider 105 for the request. The user can authenticate on the identity provider application by signing in with a username and password, biometrics (e.g., faceprint, fingerprint, breathprint, iris scan, or the like), or any suitable sign-in method, which authenticates the user's digital identity. Upon authentication, the identity provider 120 sends the validation result to the identity network 105 (Digital Identity Validation Result (3)).

A validation module 215 in the identity network 105 can receive the validation result from the identity provider 120. The validation result may include the session identifier such that the identity network 105 can track and ensure that the validation result is for the initial request. In addition, the identity provider 120 can provide, via the identity provider application, a request for consent to the user. The consent can include a description explaining that the user is consenting to having the identity network 105 broker the release of the user's credit report from the credit reporting agency 220 to the relying party. If the user consents, the identity provider 120 can provide the consent to the identity network 105.

The validation module 215 can send the consent and unlock request to the credit reporting agency 220 (Unlock Request (4)). The unlock request can include information including the name of the user for whom the credit report is requested including identifying information (e.g., social security number) for the user that may be required for the credit reporting agency 220 to identify the user. The unlock request may also include the session identifier. In response, the credit reporting agency 220 can provide a credit report key to the identity network 105 (Unlock Response (5)). The credit report key can be a key used to access the user's credit report by the relying party application 205. The unlock response may also include the session identifier.

The identity network 105 can send the credit report key with the session identifier to the relying party application 205 (Unlock Response (6)). Once the relying party application 205 receives the credit report key, the relying party application 205 can send the credit report key and the session identifier to the credit reporting agency 220 (CR Request (7)). The credit reporting agency 220 can use the credit report key and session identifier to identify the appropriate credit report to share as well as validate that the relying party application 205 is the valid party to whom the credit report should be released. Once validated, the credit reporting agency 220 sends the user's credit report to the relying party application 205 (CR Response (8)).

Figure 3:
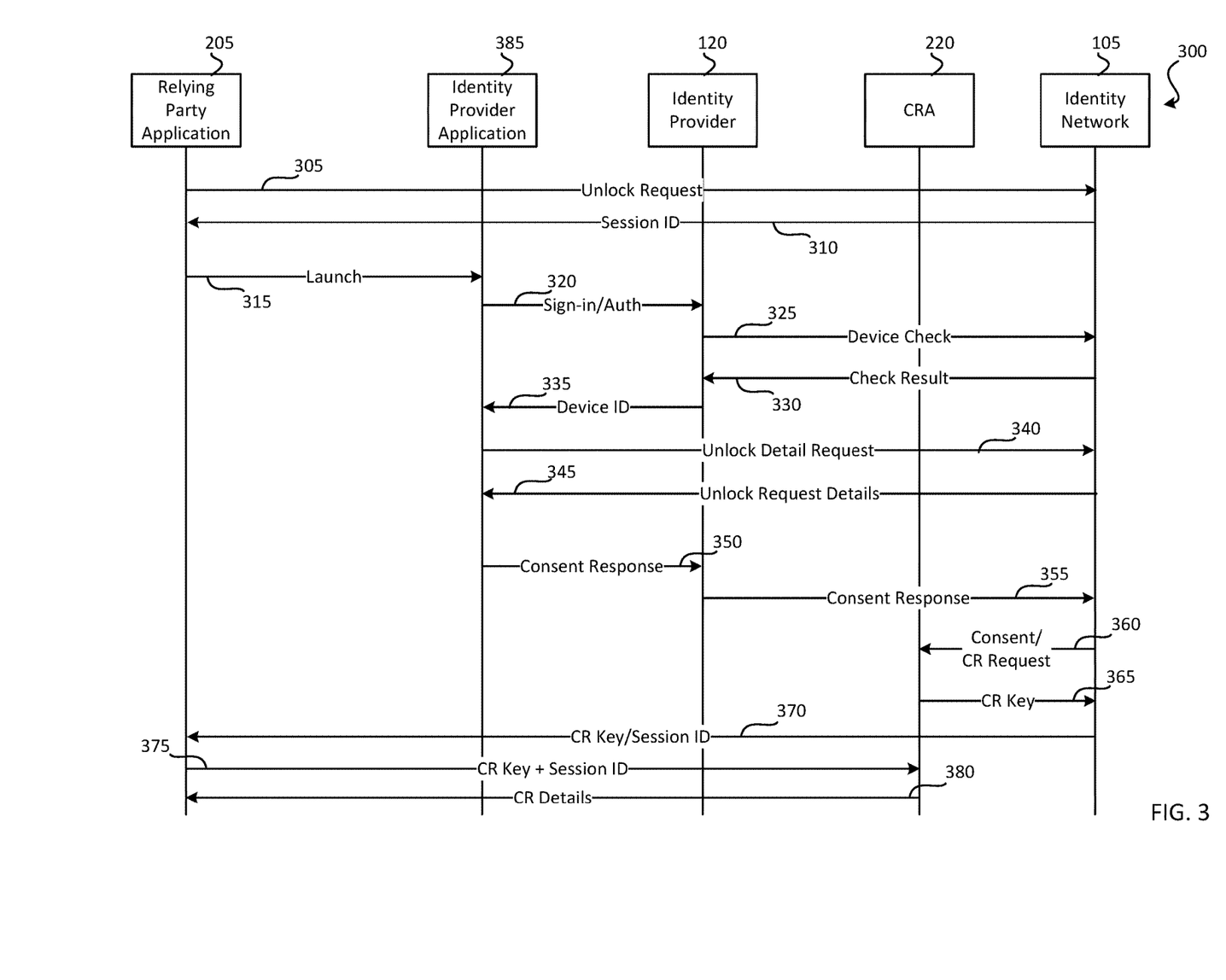
FIG. 3 illustrates an example swim diagram for a credit access flow according to an embodiment.

FIG. 3 illustrates a swim diagram 300 showing messaging and activities between components in the system 100 for a credit report release to a relying party 110 via the relying party application 205 for a user having a digital identity. The swim diagram 300 includes communication and activities conducted by relying party application 205, identity provider application 385, identity provider 120, credit reporting agency 220, and identity network 105. Relying party application 205 may be the relying party's web or mobile application on the user's device. Identity provider application 385 may be the identity provider's web or mobile application on the user's device. Activities performed by identity provider 120 may be performed by a server or computer system such as computing device 600. Identity network 105 activities may also be performed by a server or computer system such as computing device 600.

The activity may begin when a user attempts to obtain services from the relying party 110 by accessing the relying party application 205 on the user's device. The relying party may wish to access the user's credit report before providing the requested service, product, line of credit, or the like. A screen such as that shown in FIG. 2 may provide an unlock button for the user to click. Upon clicking the button, the relying party application 205 may send an unlock request to the identity network 105 as shown by arrow 305. The identity network 105 may generate a session identifier (Session ID) for the unlock request and transmit the session identifier to the relying party application 205 as shown by arrow 310. In addition to generating the session ID, the identity network 105 may identify the user's identity provider 120, which the user may have previously selected from a list of identity providers 120 provided by the identity network 105 when the user signed up for a digital identity. The identity network 105 may provide a link for the identity provider's application to the relying party application 205 in addition to the session ID.

Upon receiving the session ID and the identity provider link, the relying party application may redirect control of the application 205 to the relying party SDK, providing the session ID and identity provider link to the SDK. The relying party SDK will have been implemented into the relying party application 205 when the relying party signed up as a relying party with the identity network 105. The relying party SDK will then launch the identity provider application 385 using the link as shown by arrow 315.

The user will login to the identity provider application 385 as the user normally would when the application 385 launches, so the login information and authorization request along with the session ID is sent to the identity provider 120 as shown by arrow 320. The user may login using a username/password combination, biometrics (e.g., faceprint, breathprint, fingerprint, iris scan, or the like), or any other suitable authentication method. The identity provider 120 sends a device check request with the session ID to the identity network 105 as shown by arrow 325. The device check includes sending the device identifier to the identity network 105 for validation of the device with the identity network 105. For example, the identity network 105 may check the device identifier to ensure it is associated with the user, check previous and current activity saved and associated with the device identifier for suspicious activity (e.g., using machine learning models), and/or generate a confidence score that the user and/or device are legitimate for the requested activity. Device identifiers are discussed in more detail with respect to FIG. 4. The device check result and session ID are passed back to the identity provider 120 as shown by arrow 330. Once the device check and the login information are validated, the authorization is returned with the session ID and device identifier by identity provider 120 to the identity provider application 385 as shown by arrow 335.

The identity provider application 385 also includes an identity provider SDK which handles the request. First, upon receiving the authorization, session ID, and device identifier, the SDK requests the details of the unlock request from the identity network 105 and includes the session ID with the request as shown by arrow 340. The identity network 105, upon receiving the detail request and session ID returns the unlock request details and session ID to the identity provider application 385 as shown by arrow 345. The unlock request details may include the relying party that is requesting the credit report, for example.

Upon receiving the details of the unlock request including what relying party is requesting the unlock, the identity network SDK via the identity provider application 385 requests consent of the user to provide the user's credit report to the relying party 110. The consent request may be a textual message that includes the details of the request or, in some embodiments, simply requests permission to provide user details to the relying party 110. If the user grants consent, the consent and session ID are sent to the identity provider 120 as shown by arrow 350 and then to the identity network 105 as shown by arrow 355. The consent response may be provided to the identity network 105 even if the user declined to provide consent, at which time the identity network 105 may cancel the unlock request.

Once the identity network 105 receives the consent response and session ID, the identity network 105 transmits the consent (if approved), the unlock request, and the session ID to the credit reporting agency 220 as shown by arrow 360. The credit reporting agency 220 uses the information in the unlock request to generate a credit report key for the user's credit report that can be used by the relying party 110 to access the user's credit report. In some embodiments, the user's credit may be locked or frozen by the credit reporting agency. In such cases, in some embodiments, the consent and authentication by the third party identity provider 120 may be sufficient for the credit reporting agency 220 to release the credit report of the user to the relying party 110, depending on the arrangement with the identity network 105 and/or the previous terms and conditions the user agreed to with the credit reporting agency 220. In some embodiments, the user may have to contact the credit reporting agency 220 to unfreeze the user's credit temporarily. In either case, the authentication of the user by the identity provider 120 for the credit reporting agency 220 and the relying party 110 helps ensure that unauthorized access to the user's credit is avoided.

The credit reporting agency 220 provides the credit report key with the session identifier to the identity network 105 as shown by arrow 365. The identity network 105 sends the credit report key and session identifier to the relying party application 205 as shown by arrow 370. The relying party application 205 can then use the credit report key to access the user's credit report from the credit reporting agency 220. The relying party application 205 can send the session ID with the credit report key to the credit reporting agency 220 as shown by arrow 375, which validates for the credit reporting agency 220 that the relying party application 205 is authorized to access the user's credit report because the relying party application 205 should be the only entity besides the identity network 105 that has both the session ID and the credit report key. In response, the credit reporting agency sends the relying party application 205 the user's credit report as shown by arrow 380.

Figure 4:
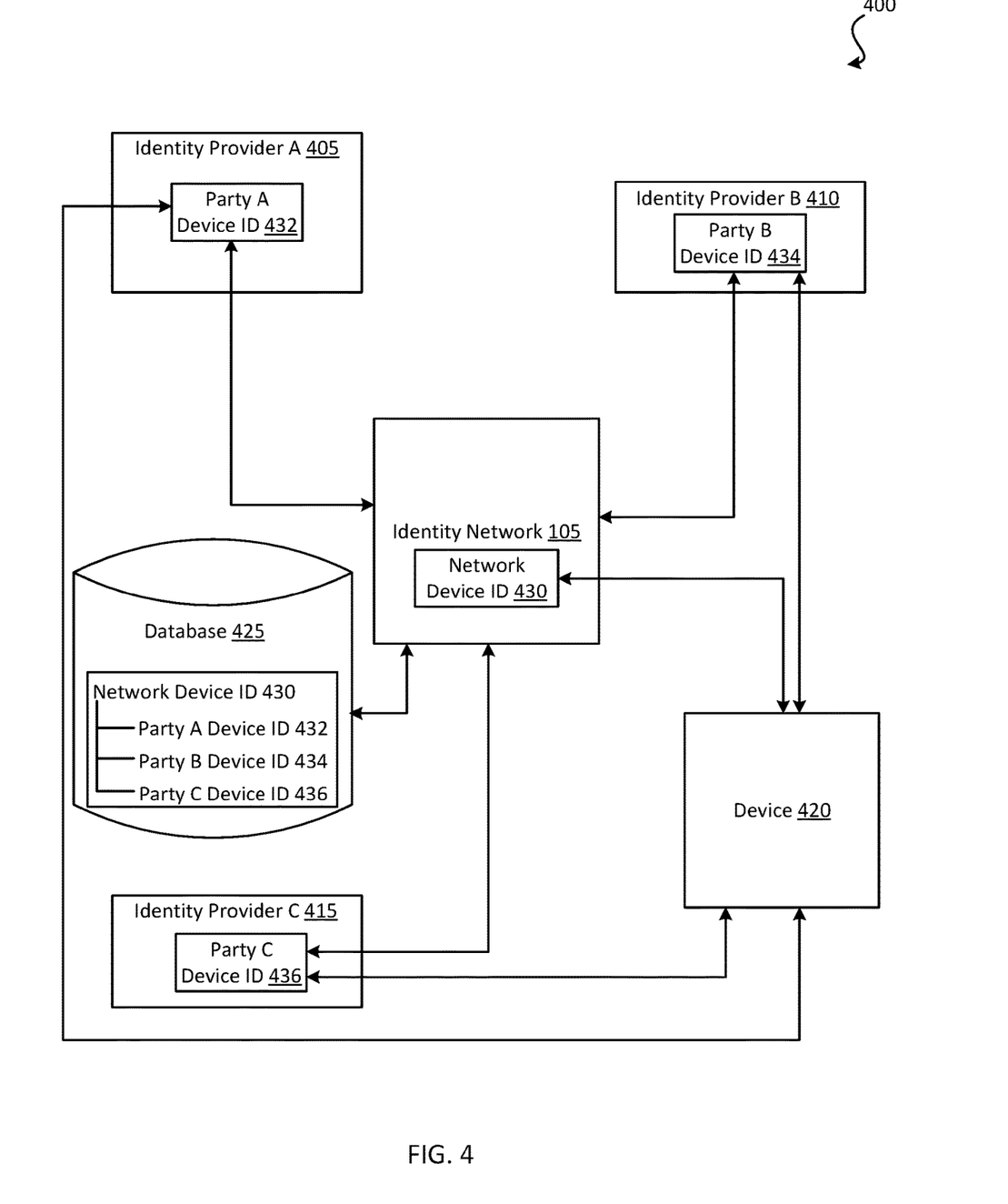
FIG. 4 illustrates an example common identifier data flow for identifying suspicious activity of a digital identity, according to an embodiment.

FIG. 4 illustrates a system 400 showing common device identifiers for a device 420, which can be used by the identity network 105 to identify, for example, suspicious activity of the device 420. The identity network 105 may have access to information about transactions of device 420 across many identity providers while each individual identity provider (405, 410, and 415) only has access to interactions with that identity provider. The identity network 105 has a more universal view that can be used as a benefit to both the identity providers and the user of the device 420. System 400 includes identity provider A 405, identity provider B 410, identity provider C 415, device 420, identity network 105, and database 425. While only three identity providers are depicted in FIG. 4, any number of identity providers may be included in system 400. Further, while a single device 420 is depicted, system 400 may include any number of devices.

Identity providers A 405, B 410, and C 415 may each be a company subscribed to the identity network such as a relying party (e.g., relying party 110) or an identity provider (e.g., identity provider 120). For each identity provider 405, 410, and 415, the device 420 may have a device ID. For example, identity provider A 405 has assigned device 420 a locally unique identifier Party A Device ID 432. A different device will have a different device ID with identity provider A 405 than party A device ID 432. Similarly, identity provider B 410 may have assigned device 420 party B device ID 434, and identity provider C 415 may have assigned device 420 party C device ID 436. In this way, any activity performed between device 420 and identity provider A 405 will include party A device ID 432, any activity performed between device 420 and identity provider B 410 will include party B device ID 434, and any activity performed between device 420 and identity provider C 415 will include party C device ID 436.

Identity network 105 also has a unique device ID assigned to device 420. Network device ID 430 is the device ID assigned to device 420 by identity network 105. Any activity performed between identity network 105 and device 420 will include network device ID 430. Further, identity network 105 stores information in database 425 that links party A device ID 432, party B device ID 434, and party C device ID 436 with network device ID 430 so that identity network 105 may identify all known activity of device 420 to that single device 420.

In this way, when identity provider A 405 communicates with identity network 105 about an interaction with device 420, the information can include party A device ID 432. Identity network 105 can access database 425 to identify network device ID 430 based on the received party A device ID 432.

Identity network 105 may develop models of suspicious and normal activity for various users based on demographic and/or other data. Because identity network 105 can review all activity of device 420 with identity providers, the suspicious and normal activity models can be applied to the activity of device 420 to determine whether the device 420 activity is suspicious. If suspicious, identity network 105 can send an alert to the identity provider that may be interacting with device 420 currently or previously. Perhaps, for example, device 420 is a user's smartphone. If the user's smartphone is stolen and the thief accesses the user's accounts to make excessive purchases or transfer money out of the user's bank accounts, identity network 105 may identify the suspicious activity and notify identity providers that may be interacting with device 420. This not only protects the identity providers but the user as well from this type of criminal activity.

Figure 5:
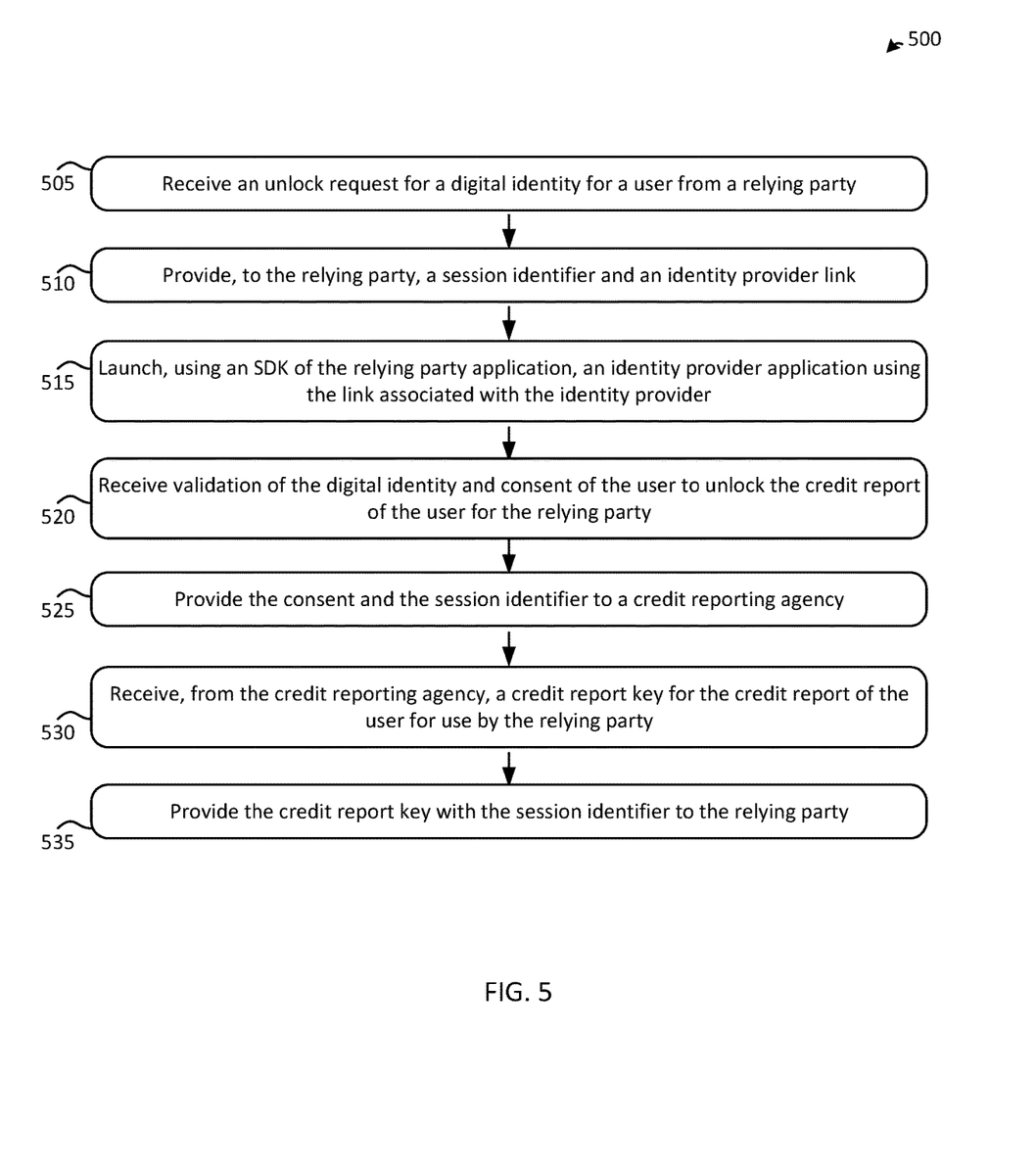
FIG. 5 illustrates an example method for unlocking credit access for an authenticated, universal digital identity for a user to a relying party, according to an embodiment.

FIG. 5 illustrates a method 500 for using an authenticated digital identity for credit report unlocking or access. Method 500 may be performed by, for example, the identity network 105. Some portions of the method 500 are performed by the SDKs provided by the identity network 105 to the identity providers 120 and the relying parties 110, which then incorporate the SDKs into their user-facing applications. Method 500 begins with step 505 when the identity network receives an unlock request for a digital identity of a user from a relying party. For example the user may want services from the relying party that require the relying party to access the user's credit report. The user may select to use the identity network digital identity for the user to authenticate and authorize the identity network to provide the consent to the credit reporting agency and authentication of the user so the relying party can access the user's credit report and confirm that the user is authentic.

At step 510, the identity network may provide a session ID and an identity provider link to the relying party for the unlock request. The session ID may be used to track the session and unlock request throughout the entire process until the relying party receives the requested credit report or the unlock request fails or ends for a different reason including, for example, lack of user consent.

At step 515, the SDK in the relying party application launches the identity provider's mobile application based on the identity provider link provided by the identity network. Each identity provider will include a deep link and/or a web redirect link such that when the user is using a mobile application of the relying party, a deep link is used to launch the identity provider mobile application. If the user is using a web application of the relying party, the web redirect link may launch a new tab or browser and open the identity provider's web application. When the mobile application or web application are launched, the SDK further provides the identity provider application with the session ID. This can be done during the launch or after the launch is initiated. The user will then log into the identity provider application as normal with the user's username and password, biometric information, or other login credentials.

At step 520, the identity network receives validation of the user's digital identity from the identity provider as well as consent from the user to unlock and provide the user's credit report to the relying party. The identity network may also receive the session identifier with the validation from the identity provider, allowing the identity network to track the request through the entire process. The identity provider can obtain the consent by providing the user with an explanation and request for consent though an SDK that the identity network provides to the identity provider when the identity provider registers as an identity provider with the identity network. The user can see the consent request, which may be a textual notice that the user is authorizing the identity network to provide the user's credit report to the relying party, and the request may include a place for the user to sign or a button for the user to click to either authorize or decline consent. The user's response is provided to the identity network at step 520. The session identifier may also be included with the user's response at step 520.

At step 525, the identity network provides the user's consent and the session identifier to the credit reporting agency. The credit reporting agency may have a relationship with the identity network such that an unlock request can be sent from the identity network that includes sufficient information to allow the credit reporting agency to identify the credit report of the user. The credit reporting agency may have an agreement to allow the identity network to obtain the user's consent and provide it to the credit reporting agency. Once the request is received and the credit reporting agency identifies the user's credit report, the credit reporting agency generates a credit report key. The credit report key can be an encryption key that the relying party can use to access the user's credit report.

At step 530, the identity network receives the credit report key from the credit reporting agency. The session identifier may be included with the credit report key. At step 535, the identity network provides the credit report key to the relying party. The identity network may also provide the session identifier with the credit report key. In some embodiments, the user may further provide a confidence score as generated based upon activity associated with the device identifier and/or user activity. The confidence score may be a score indicating the identity network confidence that the user information and/or user device are not being used fraudulently. The relying party can then send the credit report key and the session identifier to the credit reporting agency. The credit report key in combination with the session identifier can confirm for the credit reporting agency that the relying party is authorized to access the user's credit report. Upon determining that confirmation, the credit reporting agency can send the user's credit report to the relying party.

FIG. 6 illustrates a block diagram of an example computer system 600 usable for performing image analysis, normalization, and display. The computing device 600 can be or include, for example, a laptop computer, desktop computer, tablet, e-reader, smart phone or mobile device, smart watch, personal data assistant (PDA), or other electronic device.

The computing device 600 can include a processor 640 interfaced with other hardware via a bus 605. A memory 610, which can include any suitable tangible (and non-transitory) computer readable medium, such as RAM, ROM, EEPROM, or the like, can embody program components (e.g., instructions 615) that configure operation of the computing device 600. In some examples, the computing device 600 can include input/output ("I/O") interface components 625 (e.g., for interfacing with a display 645, keyboard, or mouse) and additional storage 630.

The computing device 600 can include network components 620. Network components 620 can represent one or more of any components that facilitate a network connection. In some examples, the network components 620 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 620 can be wired and can include interfaces such as Ethernet, USB, or IEEE 1394.

Although FIG. 6 depicts a single computing device 600 with a single processor 640, the system can include any number of computing devices 600 and any number of processors 640. For example, multiple computing devices 600 or multiple processors 640 can be distributed over a wired or wireless network (e.g., a Wide Area Network, Local Area Network, or the Internet). The multiple computing devices 600 or multiple processors 640 can perform any of the steps of the present disclosure individually or in coordination with one another.

Each of the instructions, calculations, or operations described herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. The instructions or operations may be stored in the memory and executed by the processor, which causes the processor to perform the instructions or operations described.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. In certain cases, method steps or operations may be performed or executed in differing order, or operations may be added, deleted, or modified. It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

It is to be understood that the figures and descriptions of embodiments of the invention have been simplified to illustrate elements that are relevant for a clear understanding of the invention. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted, or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

All patents, patent publications, patent applications, journal articles, books, technical references, and the like discussed in the instant disclosure are incorporated herein by reference in their entirety for all purposes.

What is claimed is:

1. A method for controlling access to an authenticated, universal digital identity for a user, the method comprising:
    receiving, at an identity network, an unlock request for a digital identity for a user from a relying party;
    providing, by the identity network to the relying party, a session identifier and an identity provider link;
    launching, by the identity network using a software development kit of a relying party application and the identity provider link, an identity provider application of an identity provider associated with the identity provider link, wherein launching the identity provider application comprises providing the session identifier;
    receiving, at the identity network from the identity provider, validation of the digital identity for the user and a consent response from the user for unlocking a credit report of the user for the relying party;
    transmitting, by the identity network, the consent response and the session identifier to a credit reporting agency;
    receiving, at the identity network from the credit reporting agency, a credit report key for the credit report of the user for use by the relying party and the session identifier; and
    transmitting, by the identity network to the relying party, the credit report key and the session identifier.

2. The method of claim 1, further comprising:
    receiving, at the identity network, a device identifier of a device being used by the user; and
    identifying the identity provider based on the device identifier.

3. The method of claim 1, wherein receiving validation of the digital identity for the user comprises receiving an indication that the digital identity of the user was authenticated by the identity provider.

4. The method of claim 1, further comprising:
    receiving, at the identity network, a device identifier of a device being used by the user; and
    performing, by the identity network, a device check based on the device identifier.

5. The method of claim 4, wherein performing the device check comprises:

obtaining activity associated with the device identifier;
calculating a confidence score based on the activity associated with the device identifier and the unlock request; and
transmitting the confidence score to the relying party with the credit report key.

6. The method of claim 1, further comprising:
receiving, at the identity network from the identity provider, a detail request; and
transmitting, by the identity network, at least a portion of the unlock request to the identity provider.

7. The method of claim 1, wherein the relying party uses the credit report key to obtain the credit report of the user from the credit reporting agency.

8. A system for controlling access to an authenticated, universal digital identity for a user, the system comprising:
one or more processors; and
a memory having stored thereon instructions that, upon execution by the one or more processors, cause the one or more processors to:
receive an unlock request for a digital identity for a user from a relying party;
provide, to the relying party, a session identifier and an identity provider link;
launch, using a software development kit of a relying party application and the identity provider link, an identity provider application of an identity provider associated with the identity provider link, wherein launching the identity provider application comprises providing the session identifier;
receive, from the identity provider, validation of the digital identity for the user and a consent response from the user for unlocking a credit report of the user for the relying party;
transmit the consent response and the session identifier to a credit reporting agency;
receive, from the credit reporting agency, the session identifier and a credit report key for the credit report of the user for use by the relying party; and
transmit, to the relying party, the credit report key and the session identifier.

9. The system of claim 8, wherein the instructions comprise further instructions that, upon execution by the one or more processors, cause the one or more processors to:
receive a device identifier of a device being used by the user; and
identify the identity provider based on the device identifier.

10. The system of claim 8, wherein receiving validation of the digital identity for the user comprises receiving an indication that the digital identity of the user was authenticated by the identity provider.

11. The system of claim 8, wherein the instructions comprise further instructions that, upon execution by the one or more processors, cause the one or more processors to:
receive a device identifier of a device being used by the user; and
perform a device check based on the device identifier.

12. The system of claim 11, wherein the instructions to perform the device check comprises further instructions that, upon execution by the one or more processors, cause the one or more processors to:
obtain activity associated with the device identifier;
calculate a confidence score based on the activity associated with the device identifier and the unlock request; and
transmit the confidence score to the relying party with the credit report key.

13. The system of claim 8, wherein the instructions comprise further instructions that, upon execution by the one or more processors, cause the one or more processors to:
receive, from the identity provider, a detail request; and
transmit at least a portion of the unlock request to the identity provider.

14. The system of claim 8, wherein the relying party uses the credit report key to obtain the credit report of the user from the credit reporting agency.

15. A non-transitory, computer readable memory device having stored thereon instructions that, upon execution by one or more processors, cause the one or more processors to:
receive an unlock request for a digital identity for a user from a relying party;
provide, to the relying party, a session identifier and an identity provider link;
launch, using a software development kit of a relying party application and the identity provider link, an identity provider application of an identity provider associated with the identity provider link, wherein launching the identity provider application comprises providing the session identifier;
receive, from the identity provider, validation of the digital identity for the user and a consent response from the user for unlocking a credit report of the user for the relying party;
transmit the consent response and the session identifier to a credit reporting agency;
receive, from the credit reporting agency, the session identifier and a credit report key for the credit report of the user for use by the relying party; and
transmit, to the relying party, the credit report key and the session identifier.

16. The memory device of claim 15, wherein the instructions comprise further instructions that, upon execution by the one or more processors, cause the one or more processors to:
receive a device identifier of a device being used by the user; and
identify the identity provider based on the device identifier.

17. The memory device of claim 15, wherein receiving validation of the digital identity for the user comprises receiving an indication that the digital identity of the user was authenticated by the identity provider.

18. The memory device of claim 15, wherein the instructions comprise further instructions that, upon execution by the one or more processors, cause the one or more processors to:
receive a device identifier of a device being used by the user; and
perform a device check based on the device identifier.

19. The memory device of claim 18, wherein the instructions to perform the device check comprises further instructions that, upon execution by the one or more processors, cause the one or more processors to:
obtain activity associated with the device identifier;
calculate a confidence score based on the activity associated with the device identifier and the unlock request; and
transmit the confidence score to the relying party with the credit report key.

20. The memory device of claim 15, wherein the instructions comprise further instructions that, upon execution by the one or more processors, cause the one or more processors to:
  receive, from the identity provider, a detail request; and
  transmit at least a portion of the unlock request to the identity provider.

\* \* \* \* \*